(12) United States Patent  (10) Patent No.: US 12,266,767 B2
Yang et al.  (45) Date of Patent: Apr. 1, 2025

(54) ENERGY STORAGE SYSTEM

(71) Applicant: LG ENERGY SOLUTION, LTD., Seoul (KR)

(72) Inventors: Mun-Seok Yang, Daejeon (KR); Ji-Won Lee, Daejeon (KR); Hyung-Uk Lee, Daejeon (KR); Yo-Hwan Kim, Daejeon (KR); Ji-Hun Kim, Daejeon (KR); Hong-Jae Park, Daejeon (KR); Sung-Han Yoon, Daejeon (KR); Hyun-Min Lee, Daejeon (KR); Seung-Jun Lee, Daejeon (KR); Tae-Shin Cho, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/737,320

(22) Filed: Jun. 7, 2024

(65) Prior Publication Data

US 2024/0332647 A1 Oct. 3, 2024

Related U.S. Application Data

(63) Continuation of application No. PCT/KR2023/000987, filed on Jan. 19, 2023.

(30) Foreign Application Priority Data

Jan. 19, 2022 (KR) .................... 10-2022-0008140

(51) Int. Cl.
*H01M 50/583* (2021.01)
*A62C 3/16* (2006.01)
(Continued)

(52) U.S. Cl.
CPC ............. *H01M 10/425* (2013.01); *A62C 3/16* (2013.01); *H01M 10/4207* (2013.01);
(Continued)

(58) Field of Classification Search
CPC ............. H01M 10/425; H01M 50/583; H01M 10/4207; H01M 10/28
See application file for complete search history.

(56) References Cited

U.S. PATENT DOCUMENTS 10,873,099 B1 * 12/2020 Gurunathan ...... H01M 8/04604
2013/0127626 A1 5/2013 Yoo
(Continued)

FOREIGN PATENT DOCUMENTS

KR 10-2013-0055156 A 5/2013
KR 10-2014-0143076 A 12/2014
(Continued)

OTHER PUBLICATIONS

International Search Report (PCT/ISA/210) issued in PCT/KR2023/000987, dated May 19, 2023.
(Continued)

*Primary Examiner* — Olatunji A Godo
(74) *Attorney, Agent, or Firm* — Birch, Stewart, Kolasch & Birch, LLP

(57) ABSTRACT

An energy storage system includes a control container configured to be connected to an external power conversion system (PCS) and an external electrical system; and a battery container including at least one battery rack and configured to be connected to the control container.

20 Claims, 7 Drawing Sheets

(51) Int. Cl.
*H01M 10/42* (2006.01)
*H01M 10/48* (2006.01)

(52) U.S. Cl.
CPC ......... *H01M 10/48* (2013.01); *H01M 50/583* (2021.01); *H01M 2010/4271* (2013.01); *H01M 2010/4278* (2013.01)

(56) References Cited

U.S. PATENT DOCUMENTS

2014/0365792 A1   12/2014  Yun
2016/0111900 A1*  4/2016  Beaston ................ H02J 7/0048
                                                                                                    320/134
2019/0237980 A1    8/2019  Yang

FOREIGN PATENT DOCUMENTS

| KR | 10-2015-0032076 A | 3/2015 |
|---|---|---|
| KR | 10-2018-0009569 A | 1/2018 |
| KR | 10-2020-0072665 A | 6/2020 |
| KR | 10-2151107 B1 | 9/2020 |
| KR | 10-2020-0134418 A | 12/2020 |
| KR | 10-2021-0015503 A | 2/2021 |
| KR | 10-2338516 B1 | 12/2021 |

OTHER PUBLICATIONS

Written Opinion of the International Searching Authority (PCT/ISA/237) issued in PCT/KR2023/000987, dated May 19, 2023.

* cited by examiner

ENERGY STORAGE SYSTEM

CROSS REFERENCE TO RELATED APPLICATIONS

The present application in a continuation of PCT/KR2023/000987, filed Jan. 19, 2023, and claims priority to Korean Patent Application No. 10-2022-0008140 filed on Jan. 19, 2022 in the Republic of Korea, the disclosures of which are incorporated herein by reference.

TECHNICAL FIELD

The present disclosure relates to energy storage, and more particularly, energy storage systems and methods.

BACKGROUND

Recently, there has been a surge in demand for portable electronic devices, such as notebook computers, video cameras, and portable smartphones. Furthermore, the development of electric vehicles, energy storage batteries, robots, satellites, and the like have been pursued in earnest. This growing landscape has consequently propelled intensive research into high-performance batteries that can endure repeated charging and discharging cycles.

Currently available batteries on the market may include nickel-cadmium batteries, nickel hydrogen batteries, nickel-zinc batteries, and lithium batteries, among others. Notably, lithium batteries have garnered considerable attention due to their virtually nonexistent memory effect when compared to their nickel-based battery counterparts. Additionally, lithium batteries exhibit exceptionally low self-discharging rates and possess high energy density, making them a preferred choice for a wide variety of applications.

Energy storage systems leveraging such advanced batteries serve as reservoirs for substantial power reserves, enabling the provision of stored power to multiple load facilities. These systems find utility in various forms, including, for example, industrial, commercial, and residential energy management setups. They may serve both as primary power grids and as emergency power sources, effectively providing power to load facilities at multiple points of use.

Conventional energy storage systems may be structured in container units, where each container houses multiple battery racks and a switchboard, among other components. Consequently, these containers are usually of a size that can contain accommodate all of the components of the energy storage system within.

In addition, when employing multiple energy storage systems, each battery container operates as an autonomous unit. This creates a challenge in that these container-unit energy storage systems must be managed separately, which may be cumbersome when centralized control and coordination is needed.

DISCLOSURE

Technical Problem

The present disclosure is designed to solve the problems of the related art, and therefore the present disclosure is directed to providing an energy storage system allowing integrated control management and having an expandable structure.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided an energy storage system, which includes a control container configured to be connected to an external power conversion system (PCS) and an external electrical system; and at least one battery container including at least one battery rack and configured to be connected to the control container.

The control container may include a DC unit configured to receive DC power from the PCS through a DC line; an AC unit configured to receive AC power from the external electrical system through an AC line; and a main controller connected to the AC unit to receive a power from the external electrical system through the AC line and communicatively connected to the PCS.

The DC unit may further include a main switch having a first end connected to the PCS and configured to be located on the DC line between the control container and the at least one battery container; and a current interrupter connected to a second end of the main switch and configured to be located on the DC line.

The current interrupter may be included in the DC unit in a number corresponding to a number of the at least one battery container.

The current interrupter may be configured to be attachable to and detachable from the DC unit.

The DC unit may further include an insulation sensor connected to the DC line and configured to measure an insulation resistance of the DC line; and a surge protector connected to the DC line and configured to prevent a surge current from flowing in the DC line.

The AC unit may include a first switch configured to have a first end connected to the external electrical system; an uninterruptible power supply unit configured to have a first end connected to a second end of the first switch; a second switch configured to have a first end connected to a second end of the uninterruptible power supply unit; and a third switch configured to have a first end connected between the external electrical system and the first end of the first switch and the a second end connected to a second end of the second switch.

The at least one battery container may be configured to be directly connected to the AC unit through the AC line and connected in parallel to the DC line.

The main controller may include a battery system controller (BSC); a master controller communicatively connected to the BSC through a first communication line; and a bank battery management system (BBMS) communicatively connected to the BSC through a second communication line.

The at least one battery container may include at least one battery rack connected to the DC unit and configured to receive DC power through the DC line; and a sub controller connected to the AC unit to receive power from the electrical system through the AC line and communicatively connected to the main controller through the first communication line and the second communication line.

The sub controller may include a slave controller communicatively connected to the master controller through the first communication line; and a rack battery management system (RBMS) configured to monitor information of a corresponding battery rack and communicatively connected to the BBMS through the second communication line.

When the at least one battery container is a plurality of battery containers, the master controller may be configured to be directly connected to each of a plurality of slave controllers included in the plurality of battery containers through the first communication line.

When the at least one battery container is a plurality of battery containers, the BBMS may be configured to be serially connected to a plurality of RBMSs included in the plurality of battery containers in a daisy chain manner through the second communication line.

The energy storage system according to another aspect of the present disclosure may further comprise a watering container connected to the AC unit to receive power from the electrical system through the AC line, connect to the master controller through a third communication line, and configured to be connected to each battery rack through a pipeline.

The watering container may be configured to output a fire extinguishing fluid therein to the pipeline when a watering command is received from the master controller.

The at least one battery container may include a sub switch configured to have a first end connected to the DC line and a second end connected to the at least one battery rack. The current interrupter may be a fuse.

In one aspect of the present disclosure, there is provided an energy storage system, which includes a control container configured to be connected to an external power conversion system (PCS) and an external electrical system and a first battery container including at least one battery rack and configured to be connected to the control container, wherein the control container includes a DC unit configured to receive DC power from the PCS through a DC line, wherein the DC unit further includes a main switch having a first end connected to the PCS and configured to be located on the DC line between the control container and the first battery container, a fuse connected to a second end of the main switch and located on the DC line, wherein the fuse is configured to be attachable to and detachable from the DC unit, an insulation sensor connect connected to the DC line and configured to measure an insulation resistance of the DC line; and a surge protector connected to the DC line and configured to prevent a surge current from flowing in the DC line, an AC unit configured to receive AC power from the external electrical system through an AC line and a main controller connected to the AC unit to receive a power from the external electrical system through the AC line and communicatively connected to the PCS.

The AC unit may include a first switch configured to have a first end connected to the external electrical system, an uninterruptible power supply unit configured to have a first end connected to a second end of the first switch, a second switch configured to have a first end connected to a second end of the uninterruptible power supply unit and a third switch configured to have a first end connected between the external electrical system and the first end of the first switch and a second end connected to a second end of the second switch.

The main controller may include a battery system controller (BSC), a master controller communicatively connected to the BSC through a first communication line and a bank battery management system (BBMS) communicatively connected to the BSC through a second communication line.

The energy storage system may further include a second battery container, a watering container connected to the AC unit to receive power from the electrical system through the AC line, the watering container being configured to output a fire extinguishing fluid therein to the pipeline when a watering command is received from the master controller, wherein the first battery container includes, at least one battery rack connected to the DC unit and configured to receive DC power through the DC line and a sub controller connected to the AC unit to receive power from the electrical system through the AC line and communicatively connected to the main controller through the first communication line and the second communication line, wherein the sub controller includes a slave controller communicatively connected to the master controller through the first communication line and a rack battery management system (RBMS) configured to monitor information of a corresponding battery rack and communicatively connected to the BBMS through the second communication line, wherein the watering container is connected to the master controller through a third communication line and the master controller is configured to be directly connected to each of a plurality of slave controllers included in the first battery container and the second battery containers through the first communication line.

Advantageous Effects

According to one aspect of the present disclosure, an energy storage system that allows integrated management for battery containers and having an expandable structure may be provided.

The effects of the present disclosure are not limited to the above, and other effects not mentioned herein will be clearly understood by those skilled in the art from the appended claims.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise.

In addition, throughout the specification, when a portion is referred to as being "connected" to another portion, it is not limited to the case that they are "directly connected", but it also includes the case where they are "indirectly connected" with another element being interposed between them.

Hereinafter, a preferred embodiment of the present disclosure will be described in detail with reference to the accompanying drawings.

Figure 1:
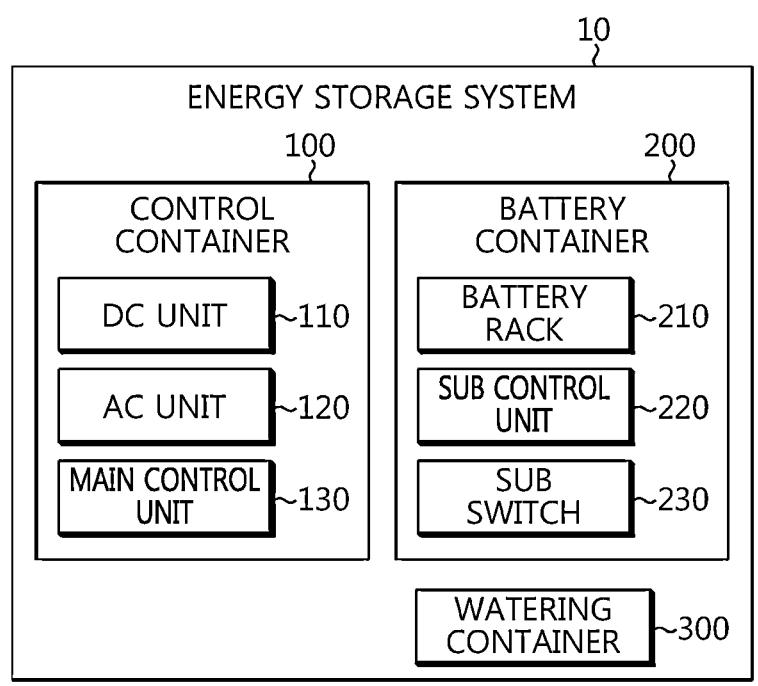
FIG. 1 is a diagram schematically showing an energy storage system according to an embodiment of the present disclosure.
Figure 2:
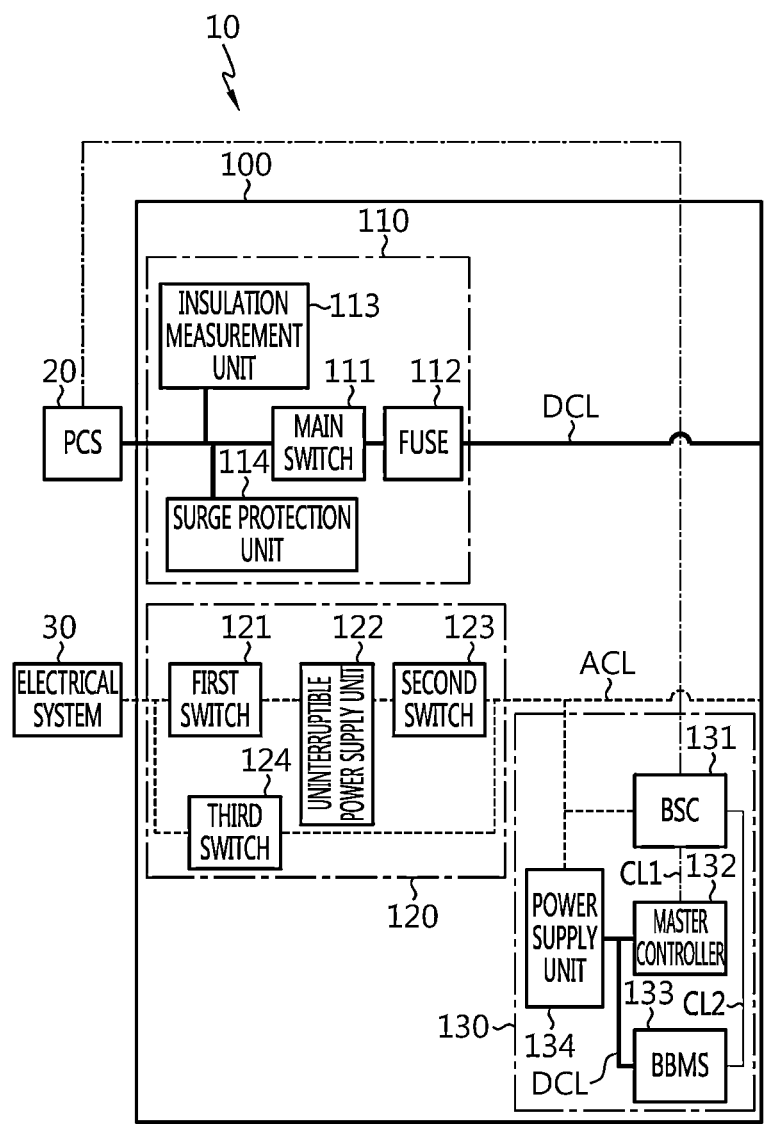
FIG. 2 is a diagram schematically showing an exemplary configuration of a control container according to an embodiment of the present disclosure.

FIG. 1 is a diagram schematically showing an energy storage system 10 according to an embodiment of the present disclosure. FIG. 2 is a diagram schematically showing an exemplary configuration of a control container 100 according to an embodiment of the present disclosure.

The energy storage system 10 according to an embodiment of the present disclosure includes a control container 100 configured to be connected to an external power conversion system (PCS) 20 and an external electrical system 30; and a battery container 200 including at least one battery rack 210 and configured to be connected to the control container 100. The battery rack is any structure capable of retaining a plurality of battery modules or battery cells. The battery modules or cells may be retained vertically, horizontally, or both. Preferably, the battery rack allows for the easy electrical connection of the battery modules or cells to each other and to other external and internal elements.

For example, the energy storage system 10 may be expressed as DC-LINK. Also, the control container 100 may be expressed as E-LINK, and the battery container 200 may be expressed as B-LINK.

Referring to FIG. 1, the control container 100 may include a DC unit 110, an AC unit 120, and a main controller 130.

The DC unit 110 may be configured to receive a DC power from the PCS 20 through a DC line DCL.

Specifically, the DC unit 110 may be electrically connected to the PCS 20 through the DC line DCL. Also, the DC unit 110 may receive a DC power from the PCS 20 through the DC line DCL. For example, the PCS 20 may convert an AC current introduced from the electrical system 30 into a DC current and output the converted DC current to the DC unit 110 as a DC power.

For example, in the embodiment of FIG. 2, the DC unit 110 may be electrically connected to the PCS 20 through the DC line DCL.

The AC unit 120 may be configured to receive an AC power from the electrical system 30 through an AC line ACL.

Specifically, the AC unit 120 may be electrically connected to the electrical system 30 through the AC line ACL. Also, the AC unit 120 may receive an AC power from the electrical system 30 through the AC line ACL. For example, the AC power may be applied to components such as heating, a HVAC (Heating, Ventilation and Air Conditioning), a lighting, and a fire suppression system (FSS) included in the control container 100.

The main controller 130 may be configured to be connected to the AC unit 120 and receive a power from the electrical system 30 through the AC line ACL. In addition, the main controller 130 may be communicatively connected to the PCS 20.

Specifically, the main controller 130 may monitor and control states of the control container 100 and the battery container 200. Also, the main controller 130 may be connected to the AC line ACL and receive an AC power from the electrical system 30. That is, since the control container 100 does not have a separate power supply, the main controller 130 may receive an AC power from the AC unit 120.

Preferably, the main controller 130 may include a power supply unit 134. Here, the power supply unit 134 is an SMPS and may be a unit that converts an alternating current AC into a direct current DC. The power supply unit 134 may be directly connected to the AC unit 120 through the AC line ACL. For example, in the embodiment of FIG. 2, the power supply unit 134 may be connected to the AC line ACL and convert an AC power to a DC power. Also, the power supply unit 134 may supply the converted DC power to the master controller 132 and the BBMS 133.

For example, in the embodiment of FIG. 2, the main controller 130 may be connected to the AC unit 120 through the AC line ACL. Also, the main controller 130 may receive an AC power from the electrical system 30 through the AC line ACL. The functions of the controller herein may be implemented in a computer-readable medium using, for example, software, hardware, or some combination thereof. For example, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller. For example, the controller is a hardware-embedded processor executing the appropriate algorithms (e.g., flowcharts) for performing the described functions and thus has sufficient structure. Also, the embodiments such as procedures and functions may be implemented together with separate software modules each of which performs at least one of functions and operations. The software codes can be implemented with a software application written in any suitable programming language. Also, the software codes can be stored in the memory and executed by the controller, thus making the controller a type of special purpose controller specifically configured to carry out the described functions and algorithms. Thus, the components shown in the drawings have sufficient structure to implement the appropriate algorithms for performing the described functions.

For a software implementation, the embodiments such as procedures and functions may be implemented together with separate software modules each of which performs at least one of functions and operations. The software codes can be implemented with a software application written in any suitable programming language. Also, the software codes may be stored in the memory and executed by the controller. Thus, the components shown in the drawings have sufficient structure to implement the appropriate algorithms for performing the described functions.

The energy storage system 10 according to an embodiment of the present disclosure may include a control container 100 and a battery container 200 individually.

Therefore, since the control container 100 and the battery container 200 are independent, the energy storage system 10 has an advantage of being easily installed. For example, since the energy storage system 10 may be configured only by connecting the communication line and the power line of the control container 100 and the battery container 200, the space limitation of the energy storage system 10 may be reduced.

In addition, the energy storage system 10 has an advantage of being able to expand the number of battery containers 200. That is, since a plurality of battery containers 200 can be easily connected to one control container 100, the capacity of the energy storage system 10 may be easily expanded.

Referring to FIG. 2, the DC unit 110 may include a main switch 111 and a fuse 112.

The main switch 111 may have one end connected to the PCS 20 and be configured to be located on the DC line DCL between the control container 100 and the battery container 200.

Specifically, the main switch 111 may be located on the DC line DCL. Also, one end of the main switch 111 may be connected to the PCS 20.

For example, in the embodiment of FIG. 2, the main switch 111 may be located on the DC line DCL, and one end of the main switch 111 may be connected to the PCS 20.

The fuse 112 may be configured to be connected to the other end of the main switch 111 and located on the DC line DCL. A circuit breaker could be used in place of the fuse as the current interrupter.

Specifically, the fuse 112 may be located on the DC line DCL. Also, one end of the fuse 112 may be connected to the other end of the main switch 111. That is, the PCS 20, the main switch 111 and the fuse 112 may be connected in series on the DC line DCL. For example, in the embodiment of FIG. 2, the fuse 112 may be located on the DC line DCL, and one end of the fuse 112 may be connected to the other end of the main switch 111.

Meanwhile, the fuse 112 may be included in the DC unit 110 in a number corresponding to the number of battery containers.

For example, the fuse 112 may be included in the DC unit 110 to block a short circuit current when a short circuit accident occurs. However, since the capacity of the fuse 112 is set in advance, if the battery container 200 is additionally connected to the control container 100, there is a problem in that the short circuit current of the energy storage system 10 cannot be blocked only with the previously installed fuse 112.

Therefore, in order to effectively block a short circuit current, the number of fuses 112 corresponding to the number of battery containers 200 may be included in the DC unit 110. To this end, the fuse 112 may be configured to be attachable to and detachable from the DC unit 110. That is, the fuse 112 may be configured to be attachable to and detachable from the DC unit 110 so that the number of fuses 112 corresponding to the number of battery containers 200 connected to the control container 100 can be included in the DC unit 110.

Also, when a plurality of fuses 112 are included in the DC unit 110, the plurality of fuses 112 may be connected in parallel. That is, as the plurality of fuses 112 are connected in parallel, the amount of short-circuit current that can be blocked can be increased.

Referring to FIG. 2, the DC unit 110 may further include an insulation sensor 113 and a surge protector 114.

The insulation sensor 113 may be configured to be connected to the DC line DCL and measure an insulation resistance of the DC line DCL. Also, the surge protector 114 may be configured be connected to the DC line DCL and prevent a surge current from flowing in the DC line DCL.

For example, in the embodiment of FIG. 2, the insulation sensor 113 and the surge protector 114 may be connected to the DC line DCL between the PCS 20 and the main switch 111.

The insulation sensor 113 may monitor the ground fault of the DC line DCL and detect the insulation resistance of the battery rack 210 included in the battery container 200. For example, the insulation sensor 113 may be an insulation monitoring device (IMD).

The surge protector 114 may protect the control container 100 and the battery container 200 from a surge current caused by lightning. For example, the surge protector 114 may be a surge protect device (SPD).

Referring to FIG. 2, the AC unit 120 may include a first switch 121, an uninterruptible power supply unit 122, a second switch 123, and a third switch 124.

The first switch 121 may be configured to have one end connected to the electrical system 30.

For example, in the embodiment of FIG. 2, the first switch 121 may be located on the AC line ACL. Also, one end of the first switch 121 may be connected to the electrical system 30.

The uninterruptible power supply unit 122 may be configured to have one end connected to the other end of the first switch 121.

Specifically, the uninterruptible power supply unit 122 may be an uninterruptible power supply system (UPS).

For example, in the embodiment of FIG. 2, the uninterruptible power supply unit 122 may be located on the AC line ACL. One end of the uninterruptible power supply unit 122 may be connected to the other end of the first switch 121.

The second switch 123 may be configured to have one end connected to the other end of the uninterruptible power supply unit 122.

For example, in the embodiment of FIG. 2, the second switch 123 may be located on the AC line ACL. Also, one end of the second switch 123 may be connected to the other end of the uninterruptible power supply unit 122. That is, the first switch 121, the uninterruptible power supply unit 122, and the second switch 123 may be connected in series on the AC line ACL.

The third switch 124 may be configured to have one end connected between the electrical system 30 and one end of the first switch 121 and the other end connected to the other end of the second switch 123.

For example, in the embodiment of FIG. 2, the third switch 124 may be connected in parallel to the first switch 121, the uninterruptible power supply unit 122, and the second switch 123. Specifically, one end of the third switch

124 may be connected to the AC line ACL between the electrical system 30 and one end of the first switch 121. Also, the other end of the third switch 124 may be connected to the AC line ACL connected to the other end of the second switch 123.

The main controller 130 may include a battery system controller (BSC) 131, a master controller 132, and a bank battery management system (BBMS) 133.

The BSC 131 is a top-level controller and may be communicatively connected to the master controller 132 and the BBMS 133.

In addition, the BSC 131 may be configured to be connected to the PCS 20 through a first communication line CL1. For example, the first communication line CL1 may be a communication line applied to a first communication protocol. As a specific example, the first communication line CL1 may be a communication line for Modbus TCP/IP communication.

The master controller 132 may be communicatively connected to the BSC 131 through the first communication line CL1.

Here, the master controller 132 is a programmable logic controller (PLC) included in the E-LINK and may be expressed as E-PLC. That is, the master controller 132 may be connected to components such as a HVAC (Heating, Ventilation and Air Conditioning), an uninterruptible power supply unit 122, a door sensor, a fuse 112, a switch, a switching mode power supply (SMPS), a fire suppression system (FSS), a surge protector 114, and an insulation sensor 113 included in the control container 100 and control these components. Also, the master controller 132 may transmit information of the control container 100 obtained from these components to the BSC 131 through the first communication line CL1. That is, the BSC 131 may receive the information of the control container 100 obtained by the master controller 132 through the first communication line CL1. Also, the BSC 131 may control the master controller 132 to control each component included in the control container 100 based on the information of the control container 100.

For example, in the embodiment of FIG. 2, the master controller 132 may be communicatively connected to the BSC 131 through the first communication line CL1. That is, the PCS 20, the BSC 131, and the master controller 132 may be connected to each other through the first communication line CL1.

The BBMS 133 may be communicatively connected to the BSC 131 through a second communication line CL2.

For example, the second communication line CL2 may be a communication line applied to a second communication protocol. As a specific example, the second communication line CL2 may be a communication line for controller area network (CAN) communication.

For example, in the embodiment of FIG. 2, the BBMS 133 may be communicatively connected to the BSC 131 through the second communication line CL2. That is, the BSC 131 may be connected to the master controller 132 and the BBMS 133 through different communication lines. Therefore, even if a defect occurs in one communication line, the BSC 131 may continue communication through the remaining communication line.

Figure 3:
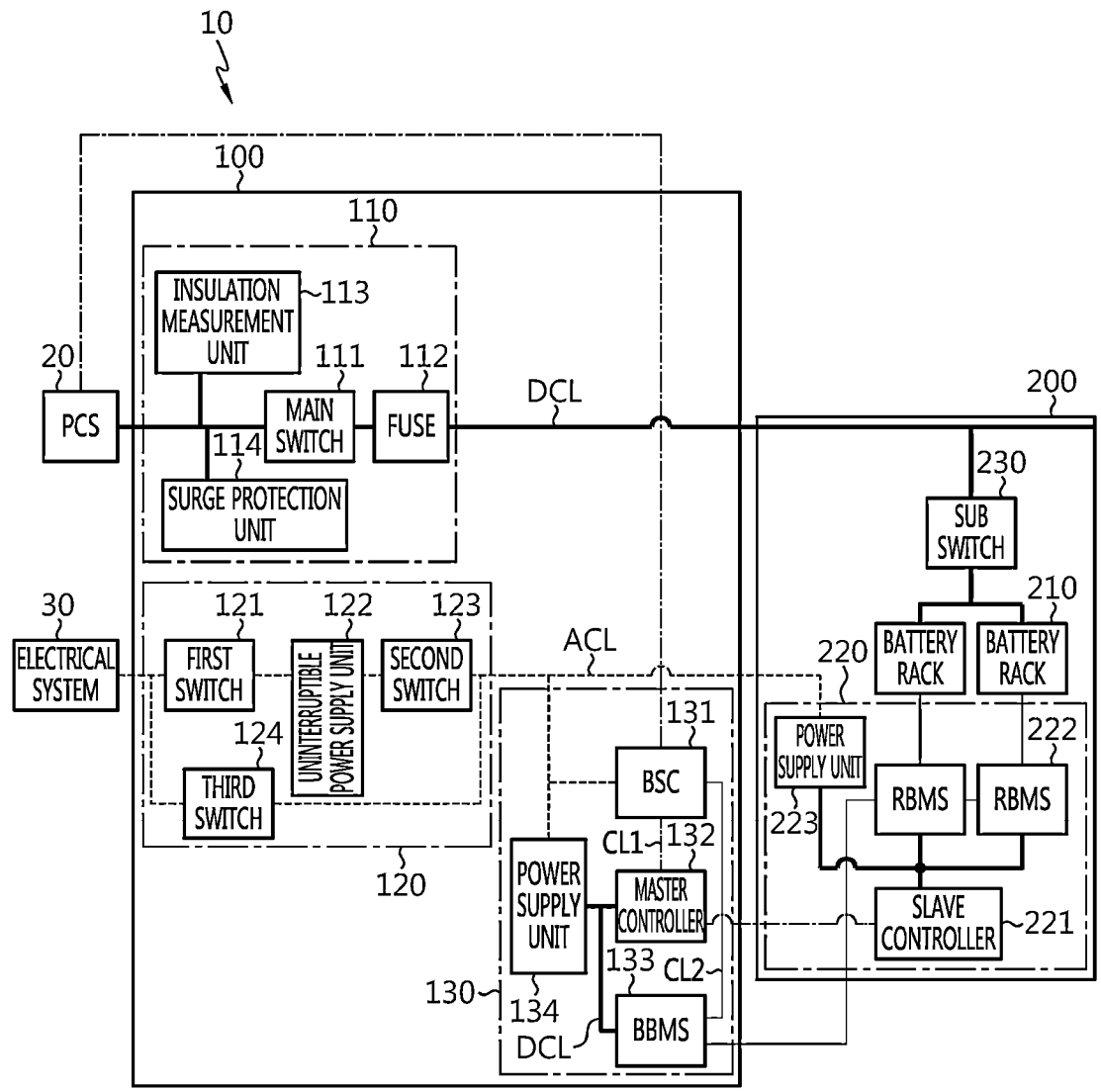
FIG. 3 is a diagram schematically showing exemplary configurations of a control container and a battery container according to an embodiment of the present disclosure.

FIG. 3 is a diagram schematically showing exemplary configurations of a control container 100 and a battery container 200 according to an embodiment of the present disclosure.

The battery container 200 may include at least one battery rack 210 and a sub controller 220.

The at least one battery rack 210 may be configured to be connected to the DC unit 110 and receive a DC power through the DC line DCL.

Specifically, the battery container 200 may include at least one battery rack 210. Also, each battery rack 210 may include at least one battery module. Also, each battery rack 210 may be connected to the DC line DCL. That is, each battery module included in each battery rack 210 may receive a DC power through the DC line DCL. For example, during a charging process of the battery rack 210, each battery module included in the corresponding battery rack 210 may receive a DC power through the DC line DCL.

For example, in the embodiment of FIG. 3, the battery rack 210 may be connected in parallel to the DC line DCL. Since the fuse 112 is connected to this DC line DCL, the short circuit current can be blocked. In addition, the ground fault and insulation of the DC line DCL are diagnosed by the insulation sensor 113, and the surge current can be prevented from flowing by the surge protector 114. Therefore, the battery module included in the battery rack 210 can be safely protected by the DC unit 110.

The sub controller 220 may be connected to the AC unit 120 to receive a power from the electrical system 30 through the AC line ACL and be communicatively connected to the main controller 130 through the first communication line CL1 and the second communication line CL2.

Specifically, the sub controller 220 may monitor and control the state of the battery container 200. Also, the sub controller 220 may be connected to the AC line ACL and receive an AC power from the electrical system 30. That is, since the battery container 200 does not have a separate power supply, the sub controller 220 can receive an AC power from the AC unit 120.

For example, in the embodiment of FIG. 3, the sub controller 220 may be connected to the AC unit 120 through the AC line ACL. Also, the sub controller 220 may receive an AC power from the electrical system 30 through the AC line ACL. Here, the main controller 130 and the sub controller 220 may be connected in parallel to the AC unit 120.

Also, in the embodiment of FIG. 3, the sub controller 220 may be communicatively connected to the main controller 130 through the first communication lines CL1 and the second communication lines CL2.

That is, the control container 100 and the battery container 200 may be electrically connected through the DC line DCL and the AC line ACL and communicatively connected through the first communication line CL1 and the second communication line CL2.

Therefore, the energy storage system 10 can be easy to expand the battery container 200. That is, a plurality of battery containers 200 may be connected to the control container 100 based on the connection to the DC line DCL, the AC line ACL, the first communication line CL1 and the second communication line CL2. Accordingly, according to an embodiment of the present disclosure, there is an advantage in that the capacity of the energy storage system 10 can be easily expanded.

The sub controller 220 may include a slave controller 221 and a rack battery management system (RBMS) 220.

The slave controller 221 may be communicatively connected to the master controller 132 through the first communication line CL1.

Here, the slave controller 221 is a PLC included in the B-LINK and may be expressed as B-PLC. That is, the slave controller 221 may be connected to a HVAC, an uninterruptible power supply unit 122, a door sensor, a gas sensor, a smoke sensor, a switch, a SMPS, a damper, a fan, a FSS, and the like included in the battery container 200 and control these components. Also, the slave controller 221 may transmit information of the battery container 200 obtained from these components to the master controller 132 through the first communication line CL1. Also, the BSC 131 may receive the information of the battery container 200 obtained by the master controller 132 through the first communication line CL1. That is, the BSC 131, the master controller 132, and the slave controller 221 may be connected to each other through the first communication line CL1. Also, the BSC 131 may control the slave controller 221 to control each component included in the battery container 200 based on the information of the battery container 200.

For example, in the embodiment of FIG. 3, the slave controller 221 may be communicatively connected to the master controller 132 through the first communication line CL1. That is, the BSC 131, the master controller 132, and the slave controller 221 may be connected to each other through the first communication line CL1.

The RBMS 222 is configured to monitor information of the corresponding battery rack 210 and may be communicatively connected to the BBMS 133 through the second communication line CL2.

Specifically, the battery container 200 may include at least one battery rack 210. Also, each battery rack 210 may include at least one battery module. The state of the battery module may be monitored by a module battery management system (MBMS). In addition, at least one MBMS may be connected to the corresponding RBMS 222 through the second communication line CL2. That is, the RBMS 222 may monitor the state of the battery rack 210 and the state of the battery module included in the battery rack 210.

Also, the RBMS 222 may be connected to the BBMS 133. That is, the BBMS 133 included in the control container 100 may be connected to the RBMS 222 included in the battery container 200 using the second communication line CL2. Also, the BBMS 133 may receive information of the corresponding battery rack 210 from at least one RBMS 222 included in the battery container 200.

For example, in the embodiment of FIG. 3, the battery container 200 may include two RBMSs 222. The RBMS 222 may be connected to the BBMS 133 through the second communication line CL2. Also, a first RBMS 222 may be connected to a second RBMS 222 through the second communication line CL2. That is, the BSC 131 and the BBMS 133 included in the control container 100 may be communicatively connected to the RBMS 222 included in the battery container 200 through the second communication line CL2.

Figure 6:
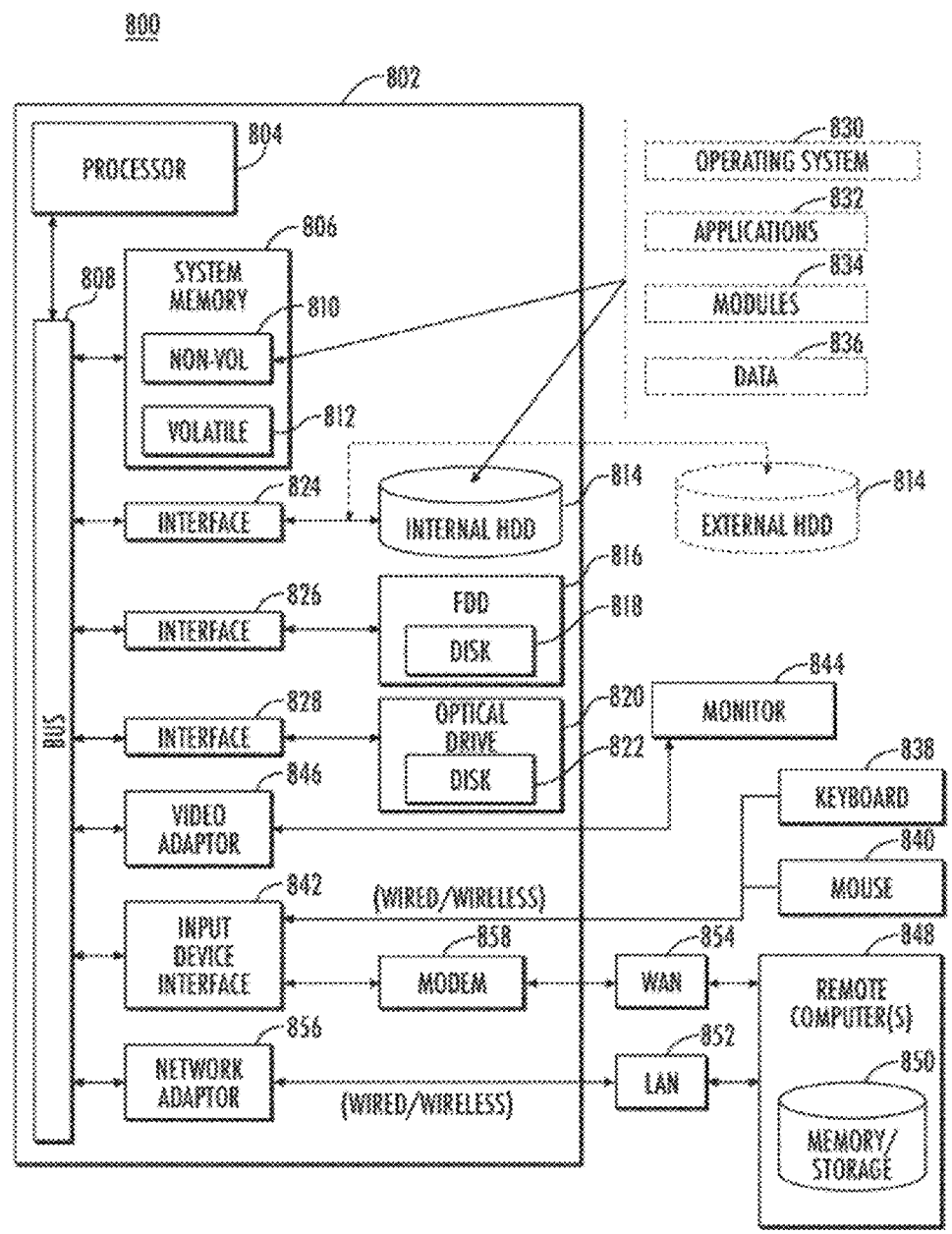
FIG. 6 is a diagram schematically illustrating a controller.

As shown in FIG. 6, master controller 132, the slave controller 221 and the battery management system the BBMS 133 and the RBMS 222, which may be a bank battery management system or rack battery management system includes a system 802 having a processor 804, a system memory 806 and a system bus 808. The processor 804 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi-processor architectures may also be employed as the processor 804.

The system bus 808 provides an interface for system components including, but not limited to, the system memory 806 to the processor 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E) ISA), Micro Channel Architecture (MCA), NuBus, Peripheral Component Interconnect (Extended) (PCI (X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 806 can include non-volatile memory 810 and/or volatile memory 812. A basic input/output system (BIOS) can be stored in the non-volatile memory 810.

The computing system 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by an HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-readable instructions, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the battery containers 200.

A user can enter commands and information into the computing system 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computing system 802. In addition to the monitor 844, a computer typically includes other peripheral output devices, such as speakers, printers, and so forth.

The computing system 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computing system 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet. A network is one or more of the LAN 852 and the WAN 854.

When used in a LAN networking environment, the computing system 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computing system 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computing system 802, or portions thereof, can be stored in the remote memory/storage device 850. It will be appreciated that the network connections shown are exemplary and other means of establishing a communications link between the computers can be used.

The computing system 802 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The energy storage system 10 according to an embodiment of the present disclosure may include a first communication line CL1 connecting the BSC 131, the master controller 132 and the slave controller 221, and a second communication line CL2 connecting the BSC 131, the BBMS 133 and the RBMS 222, respectively. Therefore, even if a defect occurs in any one communication line, communication can be continued through the other communication line.

For example, even if communication between the master controller 132 and the slave controller 221 is not normally performed since a problem occurs in the first communication line CL1, the BBMS 133 can normally receive information of the battery rack 210 from the RBMS 222 through the second communication line CL2. Therefore, the energy storage system 10 has an advantage of establishing independent communication paths through different communication lines in consideration of communication targets and communication purposes. Therefore, stable communication can be performed in the energy storage system 10.

Also, the battery container 200 may further include a sub switch 230.

Specifically, the sub switch 230 may be configured to have one end connected to the DC line DCL and the other end connected to at least one battery rack 210.

The slave controller 221 may be configured to control the operation state of the sub switch 230. Specifically, the slave controller 221 may cut off the connection between the DC line DCL and the battery rack 210 by controlling the operation state of the sub switch 230 to a turn-off state, if necessary. For example, when the door of the battery container 200 is open or a fire occurs in the battery container 200, the slave controller 221 may control the operation state of the sub switch 230 to a turn-off state.

For example, when the electrical connection between the DC line DCL and all battery containers 200 need to be cut off, the master controller 132 may control the operation state of the main switch 111 to a turn-off state. Also, the slave controller 221 may control the operation state of the sub switch 230 to a turn-off state. In this case, since the operation states of the main switch 111 and the sub switch 230 are all controlled to a turn-off state, the electrical connection between the DC line DCL and the battery rack 210 may be completely cut off.

As another example, when it is necessary to cut off the connection between the DC line DCL and the battery container 200, the master controller 132 may control the operation state of the main switch 111 to a turn-on state. In addition, the slave controller 221 included in the battery container 200 may control the operation state of the corresponding sub switch 230 to a turn-off state. In this case, a DC power may be supplied to the remaining battery containers 200 except for the battery container 200.

The energy storage system 10 according to an embodiment of the present disclosure has an advantage of controlling the electrical connection between the battery container 200 and the DC line DCL through the main switch 111 and the sub switch 230. In particular, since the electrical connection between each battery container 200 and the DC line DCL can be controlled, there is an advantage in that battery container 200 can be easily maintained and expanded.

Figure 4:
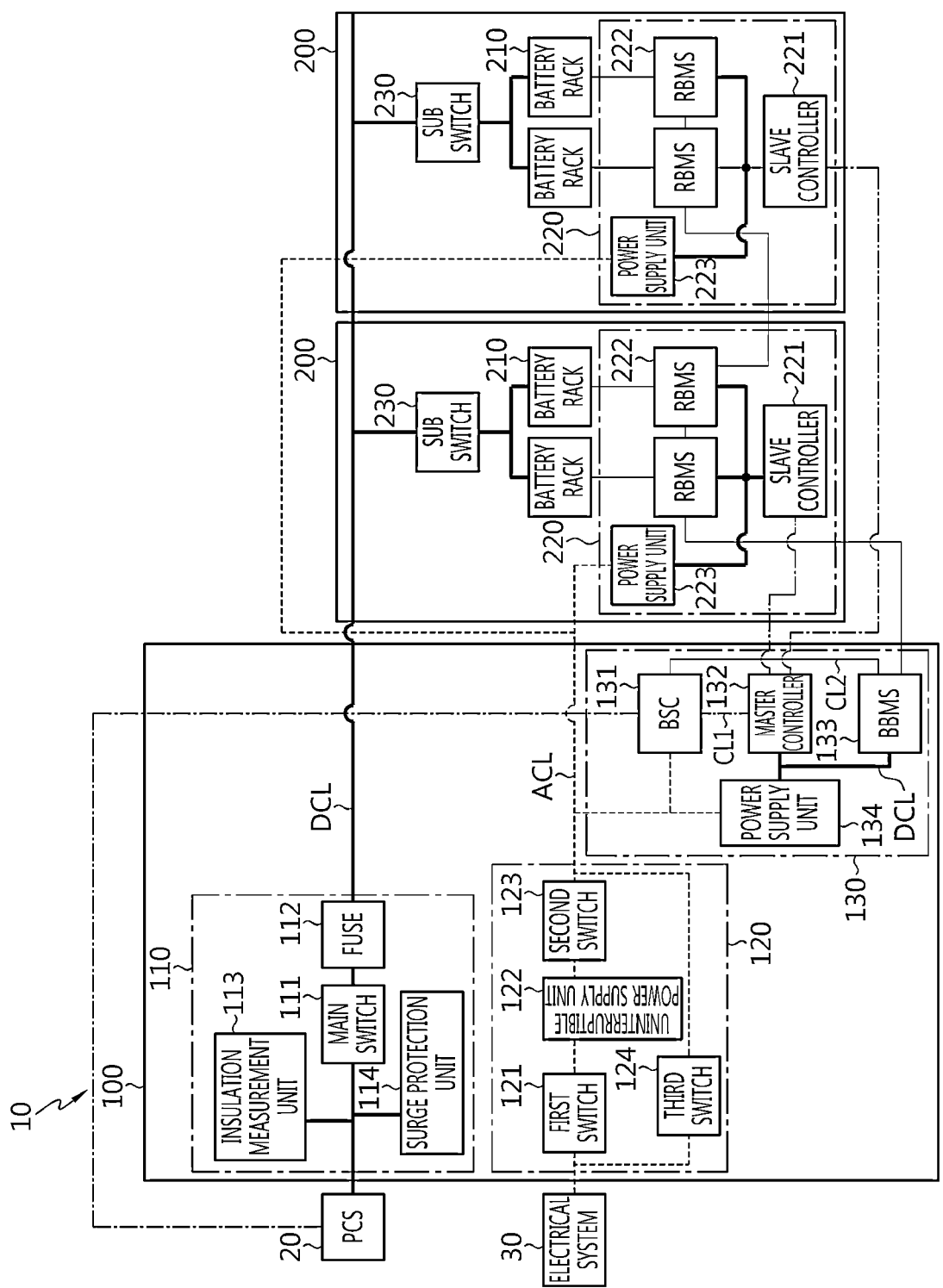
FIG. 4 is a diagram schematically showing another exemplary configuration of a control container and a battery container according to an embodiment of the present disclosure.

FIG. 4 is a diagram schematically showing another exemplary configuration of a control container 100 and a battery container 200 according to an embodiment of the present disclosure.

The battery container 200 may be configured to be directly connected to the AC unit 120 through the AC line ACL and connected in parallel to the DC line DCL.

The sub controller 220 of the battery container 200 may include a power supply unit 223. Here, the power supply unit 223 may be a SMPS. The power supply unit 223 may be directly connected to the AC unit 120 through the AC line ACL. For example, in the embodiment of FIG. 4, a plurality of battery containers 200 may be directly connected to the AC unit 120 through the AC line ACL. In addition, the power supply unit 223 may convert an AC power to a DC power and supply the converted DC power to the slave controller 221 and the RBMS 222.

Also, one end of the sub switch 230 of the battery container 200 may be connected to the DC line DCL, and the other end of the sub switch 230 may be connected to the battery rack 210. That is, a plurality of battery containers 200 may be connected in parallel to the DC line DCL. For example, in the embodiment of FIG. 4, the plurality of battery containers 200 may be connected in parallel to the DC line DCL through the sub switch 230.

When the battery container 200 is provided in plurality, the master controller 132 may be configured to be connected to each of a plurality of slave controllers 221 included in the plurality of battery containers 200 through the first communication line CL1.

Specifically, the master controller 132 may be configured to be directly connected to each of the plurality of slave controllers 221 through the first communication line CL1. For example, the master controller 132 may be configured to be directly connected to each of the plurality of slave controllers 221 through the first communication line CL1 in a home run manner.

For example, in the embodiment of FIG. 4, the master controller 132 may be directly connected to the slave controller 221 included in the battery container 200 through the first communication line CL1. Also, the master controller 132 may be directly connected to the slave controller 221 included in the battery container 200 through the first communication line CL1. That is, the communication structure between the master controller 132 and the slave controller 221 may not affect the communication structure between the master controller 132 and the slave controller 221.

Also, when the battery container 200 is provided in plurality, the BBMS 133 may be configured to be connected to the plurality of RBMSs 222 included in the plurality of battery containers 200 through the second communication line CL2.

Specifically, the BBMS 133 may be configured to be serially connected to the plurality of RBMSs 222 through the second communication line CL2. The BBMS 133 may be serially connected to the plurality of RBMSs 222 through the second communication line CL2 in a daisy chain manner.

For example, in the embodiment of FIG. 4, the BSC 131, the BBMS 133, and the RBMS 222 may be connected in a daisy chain manner through the second communication line CL2.

The energy storage system 10 according to an embodiment of the present disclosure has an advantage of improving stability of each communication path by giving independence to the communication path along the first communication line CL1 and the communication path along the second communication line CL2.

Figure 5:
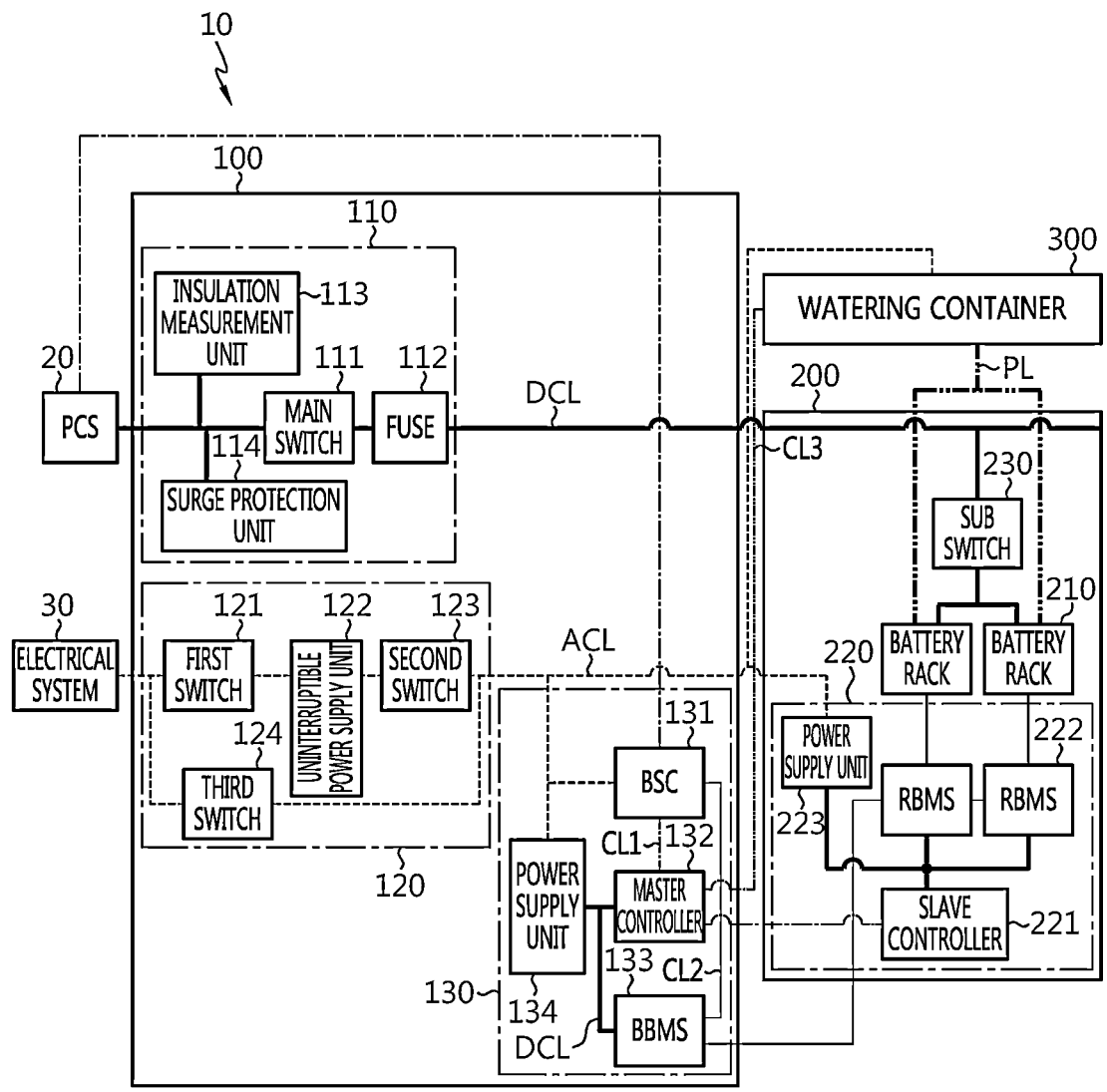
FIG. 5 is a diagram schematically showing an exemplary configuration of an energy storage system according to an embodiment of the present disclosure.

FIG. 5 is a diagram schematically showing an exemplary configuration of an energy storage system 10 according to an embodiment of the present disclosure.

Referring to FIG. 5, the energy storage system 10 may further include a watering container 300.

Specifically, the watering container 300 may include a water injection device capable of outputting a fire extinguishing fluid to the battery container 200 when a fire occurs in the battery container 200. Also, the watering container 300 may be expressed as a water injection unit (WIU).

The watering container 300 may be configured to be connected to the AC unit 120 and receive power from the electrical system 30 through the AC line ACL.

For example, in the embodiment of FIG. 5, the watering container 300 may be electrically connected to the AC unit 120 through the AC line ACL. Also, the watering container 300 may receive AC power through the AC line ACL.

The watering container 300 may be configured to be connected to the master controller 132 through a third communication line CL3.

For example, the watering container 300 may include a controller and a watering unit. When receiving a watering command from the master controller 132, the controller may control the watering unit to output a fire extinguishing fluid.

The watering container 300 may be configured to be connected to each of the battery racks 210 through a pipeline PL. Also, when a watering command is received from the master controller 132, the watering container 300 may be configured to output a fire extinguishing fluid therein to the pipeline PL.

In addition, the watering unit may be connected to the battery racks 210 included in the battery container 200 through a pipeline PL. Specifically, the watering unit may be connected to each battery module included in the battery racks 210 through the pipeline PL. Here, a breakable bulb may be provided in the pipeline PL. For example, the bulb may be configured to be damaged according to the temperature of the battery rack or battery module connected thereto.

For example, when a fire occurs in the battery container 200, the controller may receive a watering command. The controller may control the watering unit so that the watering unit outputs a fire extinguishing fluid to the pipeline PL. In this case, since the bulb is broken in the pipeline PL corresponding to the battery module where the fire occurs, the fire extinguishing fluid may be introduced into the battery module through the pipeline PL.

In the embodiment of FIG. 5, the master controller 132 may be communicatively connected to the watering container 300 through the third communication line CL3. For example, the third communication line CL3 may be a communication line applied to a third communication protocol. As a specific example, the third communication line CL3 may be a communication line for Modbus RTU communication.

The energy storage system 10 according to an embodiment of the present disclosure has an advantage of securing communication stability for each communication path by establishing independent communication paths using each of the first communication line CL1, the second communication line CL2, and the third communication line CL3.

Figure 7:
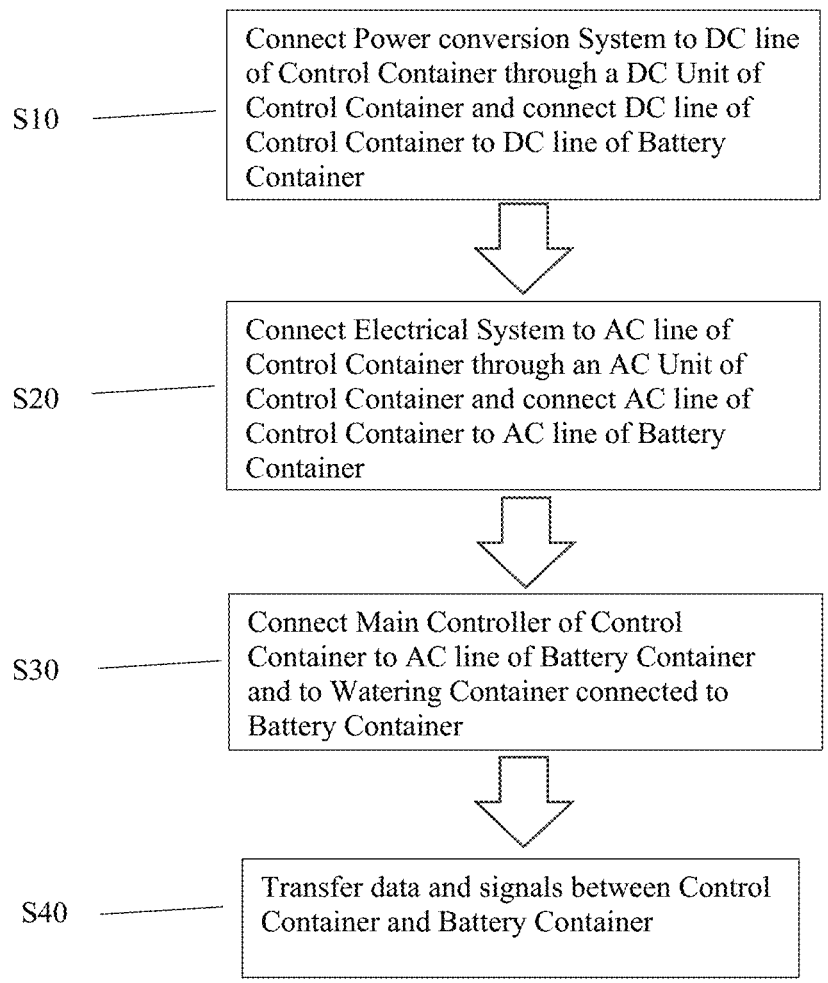
FIG. 7 is a flowchart for a method of controlling a battery container.

FIG. 7 is a flowchart depicting a method of using the Control Container 100 to control a battery container 200. Step S10 includes connecting a Power Conversion System (PCS) to the DC line of the Control Container 100 through a DC Unit 110 of the Control Container and connecting the DC line of the Control Container 100 to a DC line of the Battery Container 200. Step S20 includes connecting an Electrical System to an AC line of the Control Container 100 through an AC Unit 120 of the Control Container and connecting the AC line of the Control Container to an AC line of the Battery Container 200. Step S30 includes connecting a Main Controller 130 of the Control Container to the AC line of the Battery Container and to a Watering Container 300 connected to the Battery Container 200. Step S40 includes transferring data and signals between the Control Container 100 and the Battery Container 200.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

In addition, since the present disclosure described above can be substituted, modified and changed in various ways by those skilled in the art without departing from the technical idea of the present disclosure, the present disclosure is not limited by the embodiments described above and the accompanying drawings, and all or some of the embodiments may be selectively combined to enable various modifications.

EXPLANATION OF REFERENCE SIGNS

10: energy storage system
20: PCS
30: electrical system
100: control container
110: DC unit
111: main switch
112: fuse
113: insulation sensor
114: surge protector
120: AC unit
121: first switch
122: uninterruptible power supply unit
123: second switch
124: third switch
130: main controller
131: BSC
132: master controller
133: BBMS
134: power supply unit
200: battery container
210: battery rack
220: sub controller
221: slave controller
222: RBMS
223: power supply unit
230: sub switch
300: watering container

What is claimed is:

1. An energy storage system, comprising:
a control container configured to be connected to a power conversion system (PCS) external to the energy storage system and an electrical system external to the energy storage system; and
at least one battery container including at least one battery rack and configured to be connected to the control container,
wherein the control container includes:
a DC unit configured to receive DC power from the PCS through a DC line;
an AC unit configured to receive AC power from electrical system through an AC line; and
a main controller connected to the AC unit to receive a power from the electrical system through the AC line and communicatively connected to the PCS.

2. The energy storage system according to claim 1, wherein the DC unit further includes:
a main switch having a first end connected to the PCS and configured to be located on the DC line between the control container and the at least one battery container; and
a current interrupter connected to a second end of the main switch and configured to be located on the DC line.

3. The energy storage system according to claim 2, wherein the current interrupter is included in the DC unit in a number corresponding to a number of the at least one battery container.

4. The energy storage system according to claim 3, wherein the current interrupter is configured to be attachable to and detachable from the DC unit.

5. The energy storage system according to claim 2, wherein the DC unit further includes:
an insulation sensor connected to the DC line and configured to measure an insulation resistance of the DC line; and
a surge protector connected to the DC line and configured to prevent a surge current from flowing in the DC line.

6. The energy storage system according to claim 1, wherein the AC unit includes:
a first switch configured to have a first end connected to the electrical system;
an uninterruptible power supply unit configured to have a first end connected to a second end of the first switch;
a second switch configured to have a first end connected to a second end of the uninterruptible power supply unit; and
a third switch configured to have a first end connected between the electrical system and the first end of the first switch and a second end connected to a second end of the second switch.

7. The energy storage system according to claim 1, wherein the at least one battery container is configured to be directly connected to the AC unit through the AC line and connected in parallel to the DC line.

8. The energy storage system according to claim 1, wherein the main controller includes:
a battery system controller (BSC);
a master controller communicatively connected to the BSC through a first communication line; and
a bank battery management system (BBMS) communicatively connected to the BSC through a second communication line.

9. The energy storage system according to claim 8, wherein the at least one battery container includes:
at least one battery rack connected to the DC unit and configured to receive DC power through the DC line; and
a sub controller connected to the AC unit to receive power from the electrical system through the AC line and communicatively connected to the main controller through the first communication line and the second communication line.

10. The energy storage system according to claim 9, wherein the sub controller includes:
a slave controller communicatively connected to the master controller through the first communication line; and
a rack battery management system (RBMS) configured to monitor information of a corresponding battery rack and communicatively connected to the BBMS through the second communication line.

11. The energy storage system according to claim 10, wherein when the at least one battery container is a plurality of battery containers, the master controller is configured to be directly connected to each of a plurality of slave controllers included in the plurality of battery containers through the first communication line.

12. The energy storage system according to claim 10, wherein when the at least one battery container is a plurality of battery containers, the BBMS is configured to be serially connected to a plurality of RBMSs included in the plurality of battery containers in a daisy chain manner through the second communication line.

13. The energy storage system according to claim 9, further comprising a watering container connected to the AC unit to receive power from the external electrical system through the AC line, connected to the master controller through a third communication line, and configured to be connected to each battery rack through a pipeline.

14. The energy storage system according to claim 13, wherein the watering container is configured to output a fire extinguishing fluid therein to the pipeline when a watering command is received from the master controller.

15. The energy storage system according to claim 1, wherein the at least one battery container includes a sub switch configured to have a first end connected to the DC line and a second end connected to the at least one battery rack.

16. The energy storage system according to claim 2, wherein the current interrupter is a fuse.

17. An energy storage system comprising:
a control container configured to be connected to an power conversion system (PCS) external to the energy storage system and an electrical system external to the energy storage system; and
a first battery container including at least one battery rack and configured to be connected to the control container,
wherein the control container includes:
a DC unit configured to receive DC power from the PCS through a DC line, wherein the DC unit further includes:
a main switch having a first end connected to the PCS and configured to be located on the DC line between the control container and the first battery container;
a fuse connected to a second end of the main switch and located on the DC line, wherein the fuse is configured to be attachable to and detachable from the DC unit;
an insulation sensor connect connected to the DC line and configured to measure an insulation resistance of the DC line; and
a surge protector connected to the DC line and configured to prevent a surge current from flowing in the DC line;
an AC unit configured to receive AC power from the electrical system through an AC line; and
a main controller connected to the AC unit to receive a power from the external electrical system through the AC line and communicatively connected to the PCS.

18. The energy storage system according to claim 17, wherein the AC unit includes:
a first switch configured to have a first end connected to the electrical system;
an uninterruptible power supply unit configured to have a first end connected to a second end of the first switch;
a second switch configured to have a first end connected to a second end of the uninterruptible power supply unit; and
a third switch configured to have a first end connected between the electrical system and the first end of the first switch and a second end connected to a second end of the second switch.

19. The energy storage system according to claim 18, wherein the main controller includes:
a battery system controller (BSC);
a master controller communicatively connected to the BSC through a first communication line; and
a bank battery management system (BBMS) communicatively connected to the BSC through a second communication line.

20. The energy storage system according to claim 19, further comprising:
a second battery container; and
a watering container connected to the AC unit to receive power from the electrical system through the AC line, the watering container being configured to output a fire extinguishing fluid therein to a pipeline when a watering command is received from the master controller,
wherein the first battery container includes:
at least one battery rack connected to the DC unit and configured to receive DC power through the DC line; and
a sub controller connected to the AC unit to receive power from the electrical system through the AC line and communicatively connected to the main controller through the first communication line and the second communication line, wherein the sub controller includes:
a slave controller communicatively connected to the master controller through the first communication line; and
a rack battery management system (RBMS) configured to monitor information of a corresponding battery rack and communicatively connected to the BBMS through the second communication line,
wherein the watering container is connected to the master controller through a third communication line, and wherein the master controller is configured to be directly connected to each of a plurality of slave controllers included in the first battery container and the second battery containers through the first communication line.

* * * * *